US012610263B2

(12) United States Patent
Mehta et al.

(10) Patent No.: US 12,610,263 B2
(45) Date of Patent: Apr. 21, 2026

(54) INTEGRATION OF PHYSICAL TEST ENVIRONMENTS WITH A CLOUD-NATIVE CELLULAR CORE

(71) Applicant: Boost SubscriberCo LLC, Englewood, CO (US)

(72) Inventors: Dhaval Mehta, Littleton, CO (US); Brian Mengwasser, Denver, CO (US); Andrew Trujillo, Highlands Ranch, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 247 days.

(21) Appl. No.: 18/176,927

(22) Filed: Mar. 1, 2023

(65) Prior Publication Data
US 2023/0284053 A1 Sep. 7, 2023

Related U.S. Application Data

(60) Provisional application No. 63/315,823, filed on Mar. 2, 2022.

(51) Int. Cl.
| | |
|---|---|
| *H04W 24/06* | (2009.01) |
| *H04L 61/2596* | (2022.01) |
| *H04L 101/654* | (2022.01) |
| *H04W 24/08* | (2009.01) |
| *H04W 24/10* | (2009.01) |

(Continued)

(52) U.S. Cl.
CPC ......... *H04W 24/06* (2013.01); *H04L 61/2596* (2013.01); *H04W 24/08* (2013.01); *H04W*

*24/10* (2013.01); *H04W 28/24* (2013.01); *H04W 76/20* (2018.02); *H04L 2101/654* (2022.05)

(58) Field of Classification Search
None
See application file for complete search history.

(56) References Cited

U.S. PATENT DOCUMENTS

| | | | |
|---|---|---|---|
| 9,088,399 B1 | 7/2015 | Poon et al. | |
| 10,764,175 B1 * | 9/2020 | Filsfils | ................... H04L 45/20 |

(Continued)

FOREIGN PATENT DOCUMENTS

| | | |
|---|---|---|
| WO | 2020/185794 A1 | 9/2020 |

OTHER PUBLICATIONS

International Search Report and Written Opinion for PCT/US2023/014325 mailed Jun. 5, 2023, all pages.

(Continued)

*Primary Examiner* — Adolf Dsouza

(74) *Attorney, Agent, or Firm* — Kilpatrick Townsend & Stockton LLP

(57) ABSTRACT

Various arrangements for performing testing using a cellular network are presented. A distributed unit (DU) can be activated to be used exclusively for an isolated test environment. A communication path can be established between the DU and a radio unit (RU) located at a location to where the isolated test environment is located. Communication between the DU and a centralized unit (CU) can be established such that the CU is used as part of the isolated test environment. A test slice can be defined on the cellular network that isolates all traffic on the DU and RU from a production slice. The CU can service both the test slice and the production slice.

18 Claims, 9 Drawing Sheets

(51) Int. Cl.
| | |
|---|---|
| *H04W 28/24* | (2009.01) |
| *H04W 76/20* | (2018.01) |

(56) References Cited

U.S. PATENT DOCUMENTS

| | | | |
|---|---|---|---|
| 11,695,679 | B1 | 7/2023 | Lagerholm et al. |
| 2013/0301691 | A1 | 11/2013 | Wang et al. |
| 2016/0337919 | A1 | 11/2016 | Bindrim et al. |
| 2018/0176845 | A1 | 6/2018 | Visuri et al. |
| 2018/0316779 | A1 | 11/2018 | Dowlatkhah et al. |
| 2018/0367940 | A1 | 12/2018 | Kwong et al. |
| 2020/0081825 | A1 | 3/2020 | Parbhane et al. |
| 2020/0112497 | A1 | 4/2020 | Yenumulapalli et al. |
| 2020/0177457 | A1* | 6/2020 | Seenappa ............ H04L 41/0873 |
| 2021/0352534 | A1 | 11/2021 | Tiwari et al. |
| 2021/0352606 | A1 | 11/2021 | Hosseinian et al. |
| 2021/0400572 | A1 | 12/2021 | Caceres |
| 2022/0007451 | A1 | 1/2022 | Wang et al. |
| 2022/0060520 | A1* | 2/2022 | Carney Landow .......................... H04L 65/1104 |
| 2022/0061059 | A1 | 2/2022 | Dunsmore et al. |
| 2022/0086864 | A1 | 3/2022 | Sabella et al. |
| 2022/0104004 | A1 | 3/2022 | Huang et al. |
| 2022/0158926 | A1 | 5/2022 | Wennerstrom et al. |
| 2022/0264540 | A1 | 8/2022 | Panchal et al. |
| 2022/0337493 | A1 | 10/2022 | Sant et al. |
| 2022/0338048 | A1 | 10/2022 | Sant et al. |
| 2022/0408394 | A1 | 12/2022 | Paczkowski |
| 2023/0121268 | A1 | 4/2023 | Mueller et al. |
| 2024/0348524 | A1 | 10/2024 | Kodaypak et al. |
| 2025/0168786 | A1 | 5/2025 | Medeiros De Amorim et al. |

OTHER PUBLICATIONS

International Search Report and Written Opinion for PCT/US2023/014324 mailed May 22, 2023, all pages.

"Conference Reports", USENIX, USENIX, The Advanced Computing Systems Association, Jul. 16, 2021, pp. 1-30, XP061059774, Retrieved from the Internet: URL: http://www.usenix.org/system/files/login/articles/105438-OSDI10reports.pdf p. 97, last paragraph-p. 98, paragraph first.

* cited by examiner

800

| Activate a DU to be used for testing |
| 810 |

Establish a communication path between the DU and
the on-site testing RU    820

Establish communication between the DU and a CU to
be used for testing    830

Define a test slice to isolate test traffic from other
cellular network traffic    840

Perform testing using the on-site testing RU
850

Reassign DU and/or CU resources
860

INTEGRATION OF PHYSICAL TEST ENVIRONMENTS WITH A CLOUD-NATIVE CELLULAR CORE

CROSS REFERENCES TO RELATED APPLICATIONS

This application claims priority to provisional U.S. Patent Application No. 63/315,823, filed on Mar. 2, 2022, entitled "Cellular Network Test Environments for Subordinate Networks," the entire disclosure of which is hereby incorporated by reference for all purposes.

BACKGROUND 5G cellular networks have considerable flexibility compared to earlier-generation cellular networks. Through the use of open radio access network (O-RAN) standards in combination with component virtualization, cellular network core components that were previously implemented using specialized hardware can now be implemented as specialized software executed on general-purpose computerized hardware. By using specialized software, considerable flexibility can be present in how the core cellular network operates.

Be it software, firmware, or hardware, significant testing is required to be performed to ensure that a component functions properly on a cellular network. Embodiments detailed herein are directed to performing such testing in a way that does not adversely affect other users of the cellular network.

SUMMARY

Various embodiments are described related to a cellular network system. In some embodiments, a cellular network system is described. The system may comprise having an integrated isolated test environment. The system may comprise a cellular network, comprising a radio access network (RAN) and a cellular network core. The cellular network may service a production slice and the RAN may comprise a centralized unit (CU). The system may comprise an isolated test environment. The isolated test environment may comprise a radio unit (RU) dedicated to the isolated test environment. The isolated test environment may comprise a distributed unit (DU) dedicated to the isolated test environment. The RU may communicate with the DU. The DU may communicate with the CU of the RAN of the cellular network that services the production slice. The DU may communicate with the CU using a test slice.

Embodiments of such a system may include one or more of the following features: the DU of the isolated test environment may be co-located with the RU dedicated to the isolated test environment at a location where testing is being performed. The DU of the isolated test environment may be hosted remotely from the RU dedicated to the isolated test environment. The DU of the isolated test environment may be hosted at a local data center (LDC) with a plurality of DUs used on the production slice of the cellular network. The system may further comprise a plurality of UE. The UE may be assigned to the test slice and communicate with the CU via the RU and the DU dedicated to the isolated test environment. The system may further comprise a second isolated test environment. The second isolated test environment may comprise a second RU dedicated to the second isolated test environment. The second isolated test environment may comprise a second DU dedicated to the second isolated test environment. The second DU may communicate with a second CU of the cellular network. The DU may communicate with the second CU using a second test slice. The second CU may be dedicated to servicing only the second test slice. The cellular network core of the cellular network may be hosted using a public cloud computing platform. The CU of the cellular network may be hosted using a local zone of the public cloud computing platform. The cellular network may be a 5G New Radio (NR) cellular network and the cellular network core may be a 5G native core.

In some embodiments, a method for performing testing using a cellular network is described. The method may comprise activating, on the cellular network, a distributed unit (DU) to be used exclusively for an isolated test environment. The method may comprise establishing, on the cellular network, a communication path between the DU and a radio unit (RU) located at a location to where the isolated test environment may be located. The method may comprise establishing, on the cellular network, communication between the DU and a centralized unit (CU) to be used as part of the isolated test environment. The method may comprise defining, on the cellular network, a test slice that isolates all traffic on the DU and RU from a production slice. The CU may service the test slice and the production slice. The method may comprise performing testing using the RU and DU.

Embodiments of such a method may include one or more of the following features: the DU of the isolated test environment may be co-located with the RU dedicated to the isolated test environment at the location where testing is being performed. The DU of the isolated test environment may be hosted remotely from the location at which the RU dedicated to the isolated test environment is located. The DU of the isolated test environment may be hosted at a local data center (LDC) with a plurality of DUs used on the production slice of the cellular network. Performing the test using the on-site RU and DU may comprise performing testing using a plurality of UE. The UE may be assigned to the test slice and communicate with the CU via the RU and the DU dedicated to the isolated test environment. The method may further comprise activating, on the cellular network, a second DU to be used exclusively for a second test environment. The method may further comprise establishing, on the cellular network, a second communication path between the second DU and a second RU located at a second location to where the second test environment may be located. The method may further comprise establishing, on the cellular network, communication between the second DU and a second CU to be used as part of the second test environment. The second CU may be dedicated to servicing only the second test slice. A cellular network core of the cellular network may be hosted using a public cloud computing platform. The CU of the cellular network may be hosted using a local zone of the public cloud computing platform. The cellular network may be a 5G New Radio (NR) cellular network and the cellular network core may be a 5G native core.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguish among the similar components. If only the first reference label is used in the specification, the description is applicable to any one of the similar components having the same first reference label irrespective of the second reference label.

DETAILED DESCRIPTION

Testing is an integral step in ensuring that a cellular network will perform well under ordinary and extraordinary operating conditions. Testing can be used to ensure that a piece of user equipment (hereinafter "UE") is fully compatible with the cellular network. Testing can involve ensuring that a hardware, firmware, or software component functions properly as part of the cellular network. Testing can also involve stress-testing or chaos testing the cellular network to investigate how the cellular network performs under extraordinary conditions, such as high traffic volume or failures of particular components.

While testing is desired, adversely affecting a production cellular network, which many customers may be using, is undesirable. For example, commercial customers of a cellular network should not have the performance of their UE on the cellular network adversely affected by testing being performed. Accordingly, arrangements detailed herein are directed to how to provide a convenient cellular network test environment, such as for external vendors of the cellular network, without adversely affecting the production environment of the cellular network.

Further complicating this goal is that arrangements of the cellular network can involve a public cloud hosted core. In such embodiments, a public cloud platform, such as Amazon Web Services (AWS), is used to host virtualized components of the core of the cellular network. Advantageously, this arrangement can allow the core to be scaled quickly. However, testing may need to be performed in such a way that does not affect the production environment of the cellular network.

To accomplish these goals, one or more isolated test environments can be created that use a mix of specialized hardware, software, and cloud computing resources to allow for an entity, such as an external vendor, to perform testing involving the cellular network without negatively affecting the production environment of the cellular network. As detailed herein, particular hardware, such as a radio unit (RU) and distributed unit (DU) can be mapped to a particular slice of the cellular network that has been designated for testing. This RU and DU may only service the isolated test environment, but may rely on higher-level cellular network components, such as a centralized unit (CU), that is also used as part of the production cellular network. This concept, along with other variations, is detailed in relation to the figures.

Figure 1A:
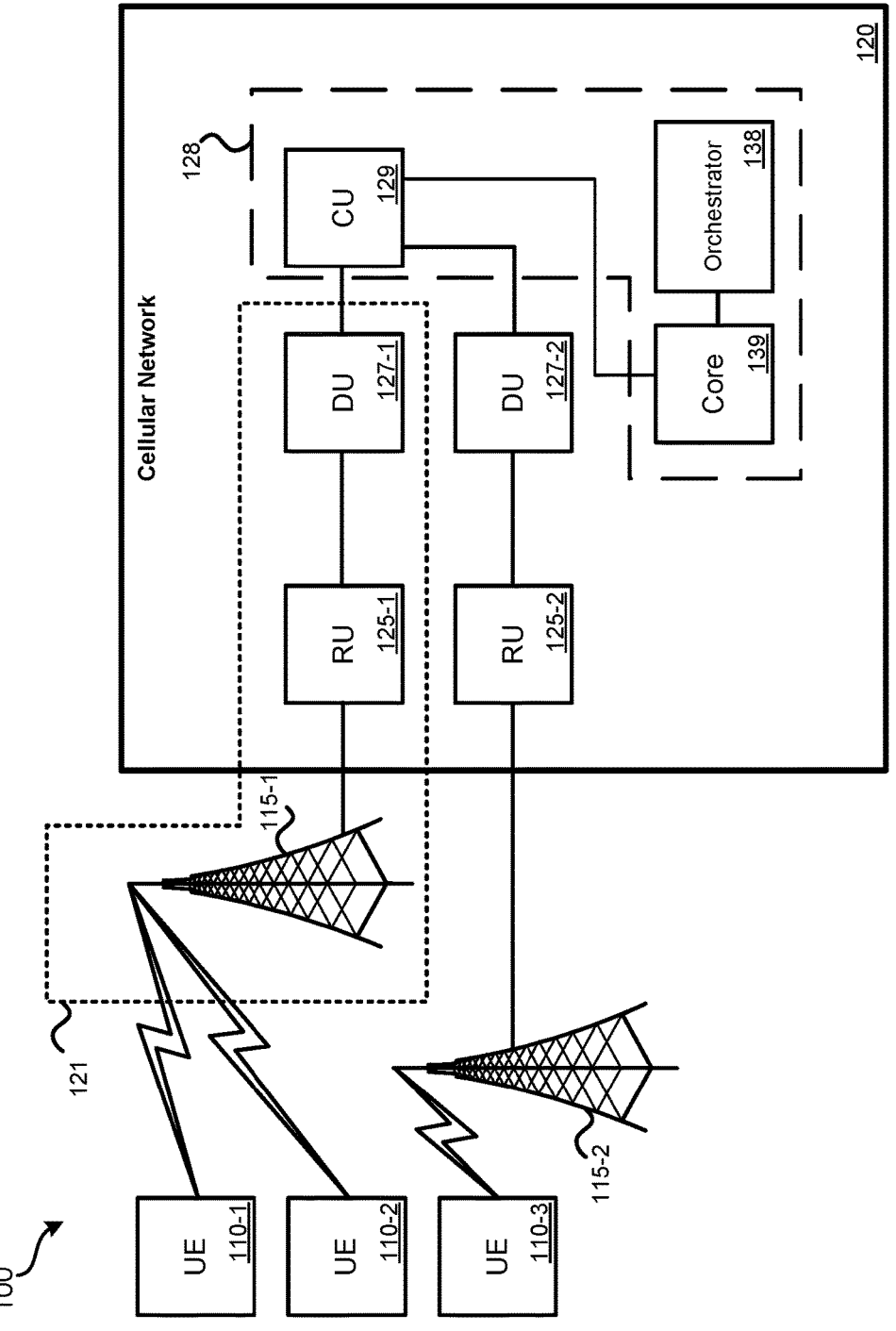
FIG. 1A illustrates an embodiment of a 5G cellular network.

FIG. 1A illustrates an embodiment of a cellular network system 100 ("system 100"). System 100 can include a 5G New Radio (NR) cellular network; other types of cellular networks, such as 4G LTE, 6G, 7G, etc. are also possible. System 100 can include: UE 110 (UE 110-1, UE 110-2, UE 110-3); base station 115; cellular network 120; radio units 125 ("RUs 125"); distributed units 127 ("DUs 127"); centralized unit 129 ("CU 129"); core 139, and orchestrator 138. FIG. 1A represents a component level view. In a virtualized open radio access network (O-RAN), because components can be implemented as software in the cloud, except for components that need to receive and transmit RF, the functionality of various components can be shifted among different servers, for which the hardware may be maintained by a separate (public) cloud-service provider, to accommodate where the functionality of such components is needed, as detailed in relation to FIG. 2.

UE 110 can represent various types of end-user devices, such as smartphones, cellular modems, cellular-enabled computerized devices, sensor devices, manufacturing equipment, gaming devices, access points (APs), any computerized device capable of communicating via a cellular network, etc. UE can also represent any type of device that has incorporated a 5G interface, such as a 5G modem. Examples include sensor devices, Internet of Things (IoT) devices, manufacturing robots, unmanned aerial (or land-based) vehicles, network-connected vehicles, environmental sensors, etc. UE 110 may use RF to communicate with various base stations of cellular network 120. As illustrated, two base stations 115 (BS 115-1, 115-2) are illustrated. Real-world implementations of system 100 can include many (e.g., hundreds, thousands) of base stations, and many RUs, DUs, and CUs. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT, such as 4G Long Term Evolution (LTE). The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1) located on site at the base station. In some embodiments, the DU may be physically remote from the RU. For instance, multiple DUs may be housed at a central location and connected to geographically distant (e.g., within a couple kilometers) RUs.

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129. Collectively, RUs, DUs, and CUs create a gNodeB, which serves as the radio access network (RAN) of cellular network 120. CU 129 can communicate with core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or core 139. Other DUs may or may not have this capability.

At a high level, the various components of a gNodeB can be understood as follows: RUs perform RF-based communication with UE. DUs support lower layers of the protocol stack such as the radio link control (RLC) layer, the medium access control (MAC) layer, and the physical communication layer. CUs support higher layers of the protocol stack such as the service data adaptation protocol (SDAP) layer, the packet data convergence protocol (PDCP) layer and the radio resource control (RRC) layer. A single CU can provide service to multiple co-located or geographically distributed DUs. A single DU can communicate with multiple RUs.

Figure 1B:
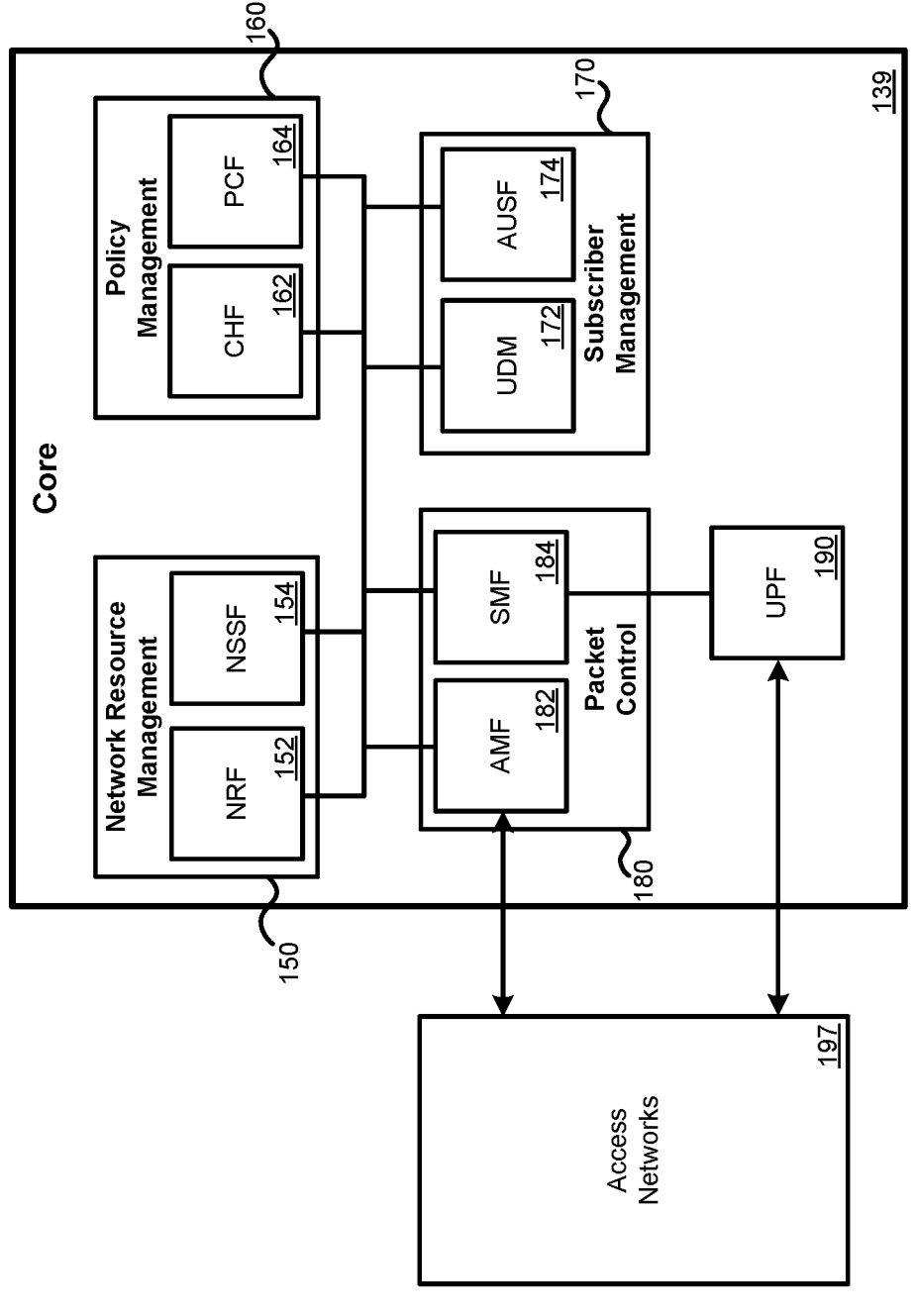
FIG. 1B illustrates an embodiment of a 5G core of a 5G cellular network.
Figure 2:
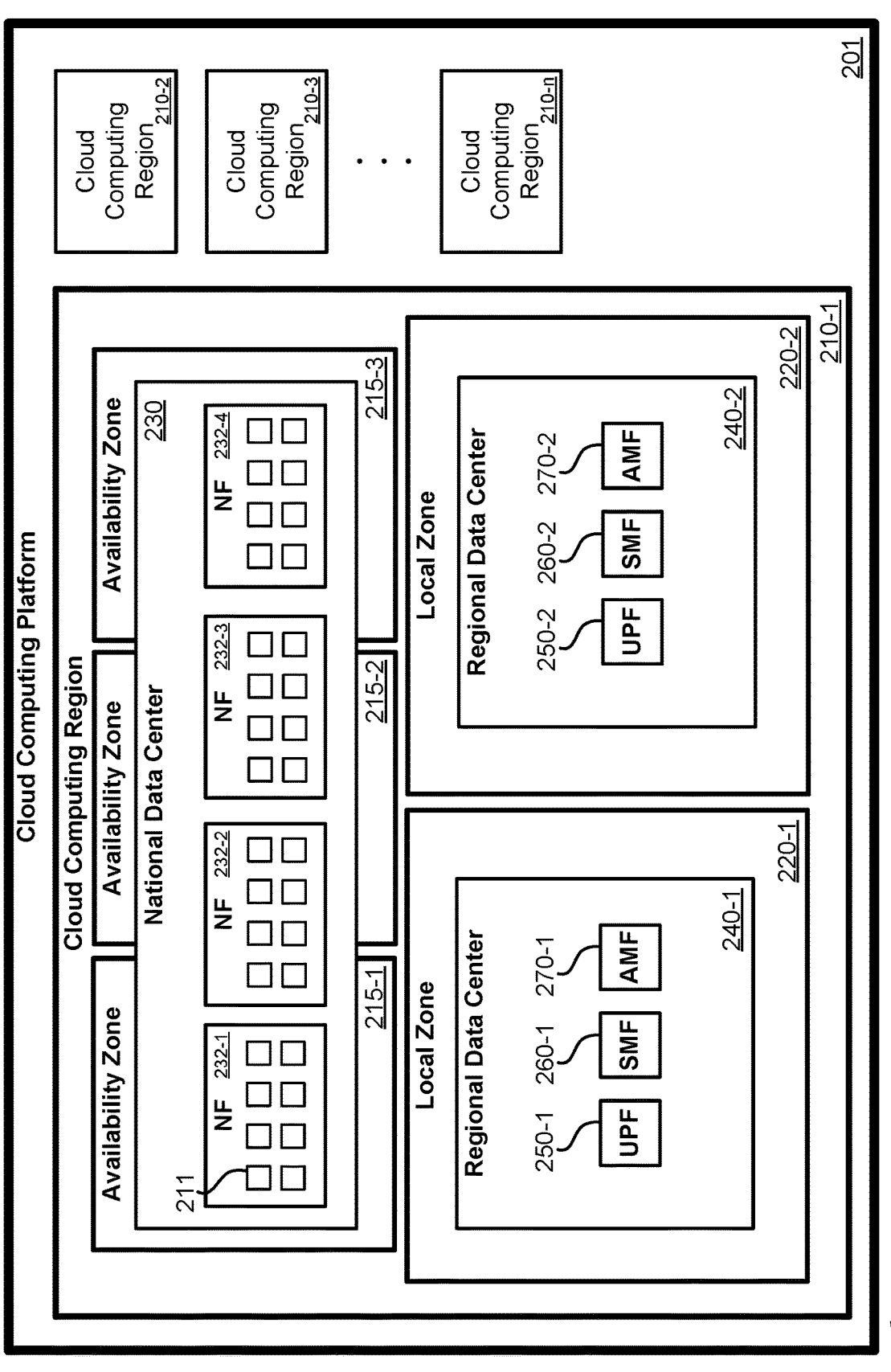
FIG. 2 illustrates an embodiment of a cellular network core implemented using a cloud computing platform.

Further detail regarding exemplary core 139 is provided in relation to FIG. 1B. core 139, which can be physically distributed across data centers or located at a central national data center (NDC) as detailed in relation to FIG. 2, and can perform various core functions of the cellular network. Core 139 can include: network resource management components 150; policy management components 160; subscriber management components 170; and packet control components 180. Individual components may communicate on a bus, thus allowing various components of core 139 to communicate with each other directly. Core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A.

While FIGS. 1A and 1B illustrate various components of cellular network 120, it should be understood that other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In a virtualized arrangement, specialized software on general-purpose hardware may be used to perform the functions of components such as DU 127, CU 129, and core 139. Functionality of such components can be co-located or located at disparate physical server systems. For example, certain components of core 139 may be co-located with components of CU 129.

In a possible O-RAN implementation, DUs 127, CU 129, core 139, and/or orchestrator 138 can be implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100, cloud-based cellular network components 128 include CU 129, core 139, and orchestrator 138. In some embodiments, DUs 127 may be partially or fully added to cloud-based cellular network components 128. Such cloud-based cellular network components 128 may be executed as specialized software executed by underlying general-purpose computer servers. Cloud-based cellular network components 128 may be executed on a public third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested. A "public" cloud-based computing platform refers to a platform where various unrelated entities can each establish an account and separately utilize the cloud computing resources, the cloud computing platform managing segregation and privacy of each entity's data.

Kubernetes, or some other container orchestration platform, can be used to create and destroy the logical DU, CU, or 5G core units and subunits as needed for the cellular network 120 to function properly. Kubernetes allows for container deployment, scaling, and management. As an example, if cellular traffic increases substantially in a region, an additional logical DU or components of a DU may be deployed in a data center near where the traffic is occurring without any new hardware being deployed. (Rather, processing and storage capabilities of the data center would be devoted to the needed functions.) When the need for the logical DU or subcomponents of the DU no longer exists, Kubernetes can allow for removal of the logical DU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new DU, orchestrator 138 can perform a pipeline of calling the DU code from a software repository incorporated as part of, or separate from, cellular network 120; pulling corresponding configuration files (e.g., helm charts); creating Kubernetes nodes/pods; loading DU containers; configuring the DU; and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet particular SLA levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at RU 125-1 and DU 127-1; a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

As illustrated in FIG. 1A, UE 110 may be operating on one or more production slices of cellular network 120. In embodiments detailed later in this document, other UE may operate on one or more slices that are used for testing.

Components such as DUs 127, CU 129, orchestrator 138, and core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

FIG. 2 illustrates an embodiment of a cellular network core network topology 200 as implemented on a public cloud-computing platform. Cellular network core network topology 200 can represent how logical cellular network groups are distributed across cloud computing infrastructure of cloud computing platform 201. Cloud computing platform 201 can be logically and physically divided up into various different cloud computing regions 210. Each of cloud computing regions 210 can be isolated from other cloud computing regions to help provide fault tolerance, fail-over, load-balancing, and/or stability and each of cloud computing regions 210 can be composed of multiple availability zones, each of which can be a separate data center located in general proximity to each other (e.g., within 100 miles). Further, each of cloud computing regions 210 may provide superior service to a particular geographic region based on physical proximity. For example, cloud computing region 210-1 may have its datacenters and hardware located in the northeast of the United States while cloud computing region 210-2 may have its datacenters and hardware located in California. For simplicity, the details of the cellular network as executed in only cloud computing region 210-1 is illustrated. Similar components may be executed in other cloud computing regions of cloud computing regions 210 (210-2, 210-3, 210-$n$).

In other embodiments, cloud computing platform 201 may be a private cloud computing platform. A private cloud computing platform may be maintained by a single entity, such as the entity that operates the hybrid cellular network. Such a private cloud computing platform may be only used for the hybrid cellular network and/or for other uses by the entity that operates the hybrid cellular network (e.g., streaming content delivery).

Each of cloud computing regions 210 may include multiple availability zones 215. Each of availability zones 215 may be a discrete data center or group of data centers that allows for redundancy that allows for fail-over protection from other availability zones within the same cloud computing region. For example, if a particular data center of an availability zone experiences an outage, another data center of the availability zone or separate availability zone within the same cloud computing region can continue functioning and providing service. A logical cellular network component, such as a national data center, can be created in one or across multiple availability zones 215. For example, a database that is maintained as part of NDC 230 may be replicated across availability zones 215; therefore, if an availability zone of the cloud computing region is unavailable, a copy of the database remains up-to-date and available, thus allowing for continuous or near continuous functionality.

On a (public) cloud computing platform, cloud computing region 210-1 may include the ability to use a different type of data center or group of data centers, which can be referred to as local zones 220. For instance, a client, such as a provider of the hybrid cloud cellular network, can select from more options of the computing resources that can be reserved at an availability zone compared to a local zone. However, a local zone may provide computing resources from nearby geographic locations where an availability zone is not available. Therefore, to provide low latency, certain network components, such as regional data centers, can be implemented at local zones 220 rather than availability zones 215. In some circumstances, a geographic region can have both a local zone and an availability zone.

In the topology of a 5G NR cellular network, 5G core functions of core 139 can logically reside as part of a national data center (NDC). NDC 230 can be understood as having its functionality existing in cloud computing region 210-1 across multiple availability zones 215. At NDC 230, various network functions, such as NFs 232, are executed. For illustrative purposes, each NF, whether at NDC 230 or elsewhere located, can be comprised of multiple subcomponents, referred to as pods (e.g., pod 211) that are each executed as a separate process by the cloud computing environment. The illustrated numbers of pods is merely an example; fewer or greater numbers of pods may be part of the respective 5G core functions. It should be understood that in a real-world implementation, a cellular network core, whether for 5G or some other standard, can include many more network functions. By distributing NFs 232 across availability zones, load-balancing, redundancy, and fail-over can be achieved. In local zones 220, multiple regional data centers 240 can be logically present. Each of regional data centers 240 may execute 5G core functions for a different geographic region or group of RAN components. As an example, 5G core components that can be executed within an RDC, such as RDC 240-1, may be: UPFs 250, SMFs 260, and AMFs 270. While instances of UPFs 250 and SMFs 260 may be executed in local zones 220, SMFs 260 may be executed across multiple local zones 220 for redundancy, processing load-balancing, and fail-over.

Figure 3:
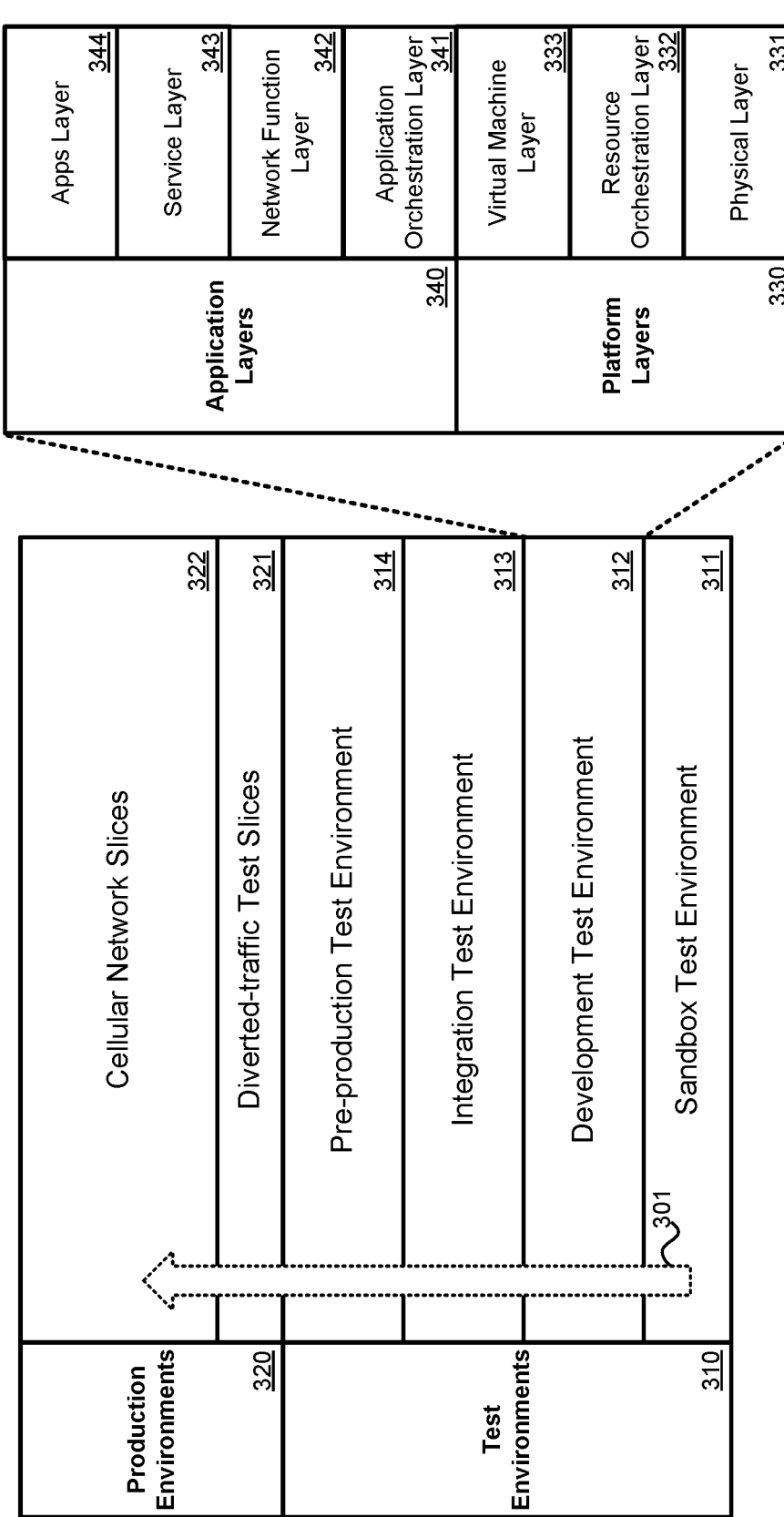
FIG. 3 illustrates an embodiment of a multi-environment cellular network test hierarchy.

FIG. 3 illustrates a cellular network test environment hierarchy 300. Testing, such as chaos testing, may involve testing various sub-optimal occurrences at each multiple level of the cellular network test environment hierarchy. Such testing can be performed on a particular slice. In general, two environments may be present: test environment 310 and production environment 320. Test environment 310 exists for the purpose of testing, while production environment 320 handles live communication traffic by clients (or customers) of the cellular network provider. Typically, testing of the functionality, communication, ability to meet specification, and the ability to handle traffic is performed starting from a lower-level test environment progressing up to one or more higher levels. Not all specific test environments need to be used for testing; rather, a developer can test in whichever one or more test environments are deemed necessary. For example, within test environment 310, four test environment levels may be present: sandbox test environment 311 (which can also be referred to as a minimal complexity test environment); development test environment 312; integration test environment 313; and pre-production test environment 314.

Further, within each test environment 311-414, various layers may be present, which may each need to be tested, such as using, but not limited to, chaos testing. Notably, chaos testing can be applied to a first layer while another layer may be tested and/or monitored. This form of testing can be referred to as cross-layer testing. As an example, chaos can be applied on a first level while the cellular network is monitored on a different, target layer. Chaos may be applied on a lower layer than the target layer that is monitored.

Six layers of development test environment 312 are illustrated; these same layers may be present for each other layer of test environment 310. The layers can include: physical layer 331; resource orchestration layer 332; virtual machine layer 333; application orchestration layer 341; network function layer 342; service layer 343; and apps layer 344. In other embodiments, fewer or greater numbers of layers may be present within each environment. In general, layers 341-444 can be understood to be different application layers 340 and layers 331-433 can be understood as platform layers.

Physical layer 331 refers to the physical infrastructure under test. For example, this layer can include simulation of one or more servers and the capabilities of such servers and communication between such servers. To perform chaos testing on physical layer 330, servers may be simulated as going offline, coming online, frames being dropped in communication, voltage supplied to equipment being low, and equipment having a reduced processing throughput. Chaos testing at the physical level can also include simulating a fiber cut (or other form of lost communication link), a decrease in available bandwidth between servers, a broken radio (or other form of loss of available radio spectrum in a region), rain, and signal attenuation, etc.

Resource orchestration layer 332 refers to a layer at which computing resources are requisitioned and instantiated on a cloud-computing platform. From the perspective of a client, such as a cellular network operator, a cloud-computing platform operated by another entity can be understood to have an effectively limitless amount of computing resources available. When such resources are needed, such as to perform new network functions or instantiate a new instance of an existing network function, such computing resources must be reserved and configured on the cloud-computing platform. Resource orchestration layer 332 can involve using Kubernetes or some other form of resource orchestration to create and destroy resources on a cloud-computing platform. Through a resource orchestration platform, such as Kubernetes, chaos testing may be performed by rate limiting communication between components (e.g., network functions, pods of a network function) or causing frames to be dropped between components.

Virtual machine layer 333 refers to the layer at which containers of components can be deployed in an O-RAN network. Virtual machine layer 333 can involve the execution of instances of virtual machines on the cloud-computing platform, wherein virtual DUs, CUs, cloud-based applications, 5G core componentry, etc. are executed by the virtual machine. To perform chaos testing on virtual machine layer 333, errors can be introduced to IP addressing, port assignments, firewalls, memory allocation, configuration of the virtual machines. More specifically, available memory for a virtual machine may be reduced, possibly gradually over time, as a form of chaos testing.

Application orchestration layer 341 represents the layer at which software components are instantiated, including network functions. The cellular network can include the execution of tens, hundreds, and even thousands of applications, some of which need to be in communication with each other. To perform chaos testing on application orchestration layer 341, simulated events can include: loading software, messaging, connectivity, software configuration, and simulated traffic volumes. As an example of a form of chaos that could be performed at application orchestration layer 341, spoofing may be performed to produce fake application-to-application messages. Testing may then be performed at a higher layer to see if the applications respond correctly, such as by recognizing them as invalid, ignoring, or otherwise filtering out the spoofed messages. Another example of chaos that could be injected is application-to-application latency. If the latency exceeds a defined value, the instance of the application may be destroyed and a new instance may be instantiated.

Network function layer 342 refers to the layer at which the confirmation, management, and coordination of processes, tasks, and services on the cellular network are performed. Orchestration can involve reconfiguring, instantiating, and rearranging components of the cellular network in order to realize particular objectives. To perform chaos testing on network function layer 342, various alarms or triggers may be triggered to see how the network reacts; various network loads may be applied to the cellular network to determine if services are properly adapted and instantiated to meet various objectives, such as the SLAs of one or more network slices. As another form of chaos, multiple instances of the same network function may be instantiated with different allocations of resources. Each of these instances can then be tested to see the amount of resources needed to effectively operate the network function.

Service layer 343 refers to the layer at which particular types of end-user services, such as voice services, messaging services, and Internet access, are coordinated and performed. Each of these services may need a particular amount of bandwidth and maximum latency, among other QoS metrics, in order to function acceptably. To perform a chaos test on service layer 343, the amount of a particular service requested may be varied substantially. For instance, a greatly increased (e.g., 3×-10×) load of voice calls may be simulated on a portion of the cellular network, such as to simulate the occurrence of a natural disaster, possibly coupled with network components, such as RUs, being out of service.

At a highest level, apps layer 344 can refer to the layer at which higher-level requirements are enforced, such as a dynamic quality of service. Apps layer 344 may further be the layer at which client-specific applications are executed for a particular customer of the cellular network. For example, while for a typical point-to-point voice call, a first amount of latency is acceptable, if a multi-party conference call is occurring over different time zones, it may be possible to dynamically adjust to a different acceptable level of latency. To perform chaos testing on apps layer 344, various alarms or triggers may be triggered to see how the network reacts; various network loads may be applied to the cellular network to determine if services are properly adapted and instantiated to meet various objectives, such as the SLAs of one or more network slices.

Each of these layers may be tested as a part of each test environment 311-414, both individually and in combination. Testing may be performed in order from least complexity through the production environment, as indicated by arrow 301. In sandbox test environment 311, minimal complexity of components of the cellular network may be involved. This could, for example, involve testing how a new software component interacts with a single other software component of the cellular network. Alternatively, it could involve testing a single software component using cellular network inputs. Chaos testing can be performed on one or more layers 331-444.

In some embodiments, one or more test environments may be made available to an external entity. For example, an external entity may be permitted access to sandbox test environment 311 in order to test the functionality of a network function developed by the external entity; the cellular network provided may provide access to a test environment such that the external entity can test the performance of the network function on the cellular network.

Development test environment 312 could involve significantly less complexity than a production environment cellular network, but greater complexity than sandbox test environment 311. For example, a group of software components that communicate with each other may be tested in development test environment 312. Chaos testing can be performed on one or more of layers 331-433 and 341-444. Integration test environment 313 would, again, include more complexity than development test environment 312 but less than a full network test environment. Again here, chaos testing can be performed on one or more of layers 331-433 and 341-444.

Pre-production test environment 314 can represent a complete replica of the cellular network being operated within test environment 310. Pre-production test environment 314 could involve simulation of both the RAT and the cloud-based components of the cellular network. In pre-production test environment 314, volumes of communication UE traffic may be simulated that are similar to the volumes of traffic experienced within production environment 320. Pre-production test environment 314 can include simulating all (or a significant percentage, such as greater than 50%) of the slices present in production environment 320. Chaos testing can be performed on one or more of layers 331-433 and 341-444 within pre-production test environment 314.

Testing may also be performed on live traffic within production environment 320. Within production environment 320, clients of the cellular network may be using the implemented cellular network for communication and therefore expect that their SLAs be met. However, in order to ensure that the cellular network is sufficiently robust to handle various failures at layers 331-433 and 341-444, chaos testing may be performed within the production environment. While testing of a particular piece of software or feature may be completed, testing is a continuous process that will likely be on-going for the life of the cellular network—software is frequently being updated and changes to the cellular network will necessitate repeated and continuous testing.

A cellular network, such as a 5G cellular network, can have slices that handle cellular network traffic for particular customers and/or particular uses according to an SLA. Within production environment 320, only a small number of slices (e.g., one, two, three, etc.) may first use the modified cellular network as part of diverted-traffic test slices 321 while the remainder of slices continue using the original production environment. Therefore, a small percentage of live cellular network traffic may first use the modified cellular network. Further, chaos testing may be performed on one or more of layers 331-433 and 341-444 of diverted-traffic test slices 321 to ensure that the modified cellular network is performing as expected in the production environment. The number of slices used as part of diverted-traffic test slices 321 may be increased during testing to put additional traffic and stress on the modified cellular network.

Once testing within diverted-traffic test slices 321 has been satisfied, cellular network slices 322, representing the remaining or all of the slices of the cellular network production environment, are processed and transmitted using the modified cellular network. Slices and environments can be dynamic and elastic in nature. They may exist for a short period of time for a specific purpose, such as to perform a test. Multiple slices may be instantiated to accelerate test scenarios in parallel.

Figure 4:
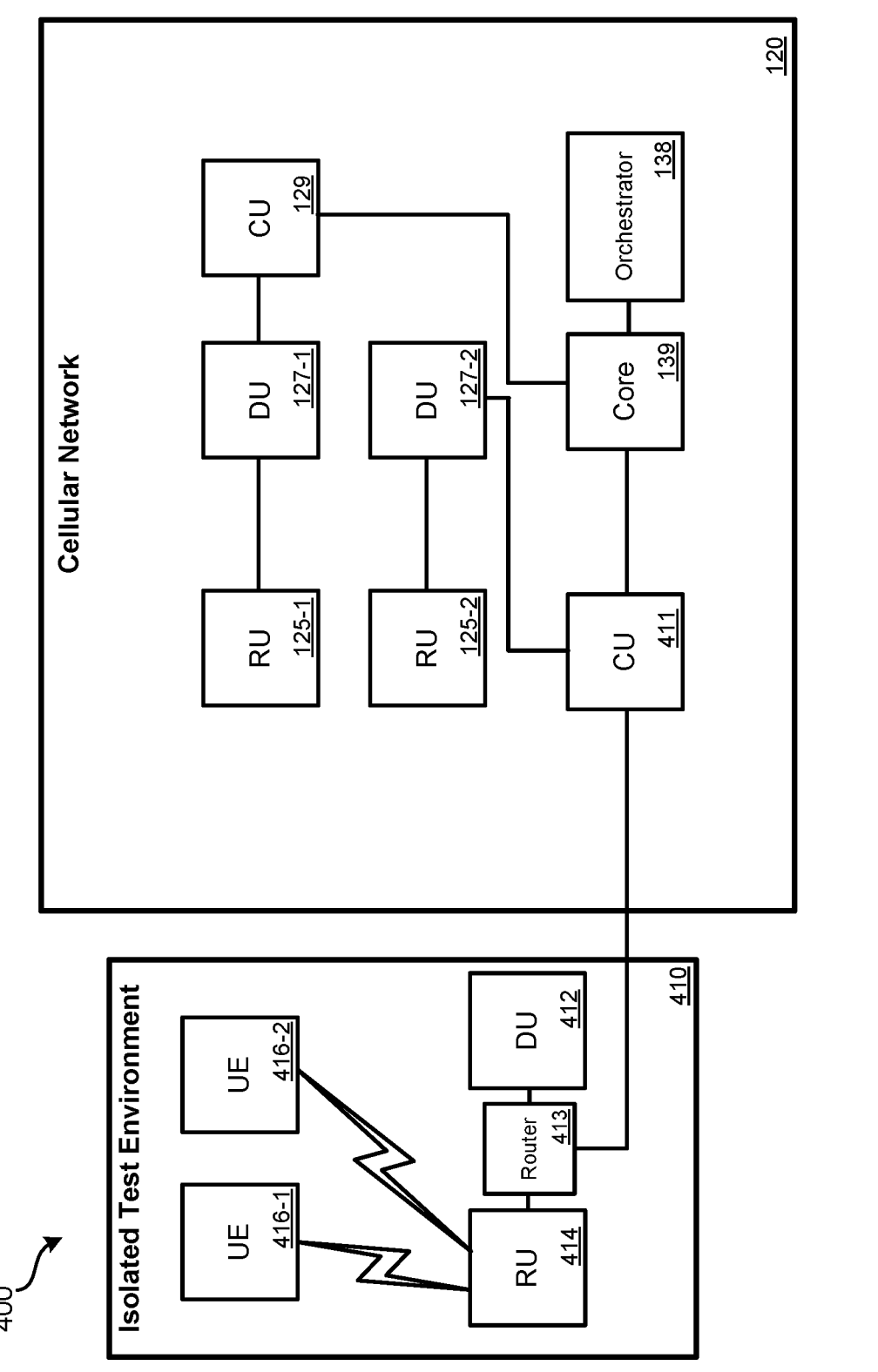
FIG. 4 illustrates an embodiment of a system in which an isolated test environment is integrated with a cellular network.

FIG. 4 illustrates an embodiment of a cellular network system ("system 400") in which an isolated test environment is integrated with a cellular network. System 400 can include cellular network 120 and isolated test environment 410.

Geographically, at least some components of isolated test environment 410 are located in a physical location where testing is to be hosted or performed. As an example, if an entity, such as an outside vendor that is separate and distinct from the operator of the cellular network, desires to perform testing, the RU of isolated test environment 410 can be located at a physical facility (e.g., laboratory, office) of the outside vendor. The RU needs to be within radio communication range of UE 416 that are involved in the test.

In the illustrated example of isolated test environment 410, two UE 416 are illustrated. The number of UE 416 is merely exemplary and may be greater or fewer in a real-world implementation. In the illustrated embodiment of system 400, a new type or version of UE may be being tested. Therefore, having the UE communicate wirelessly with RU 414 may be an important step in verifying compatibility. Alternatively, testing that is not intended to test the UE itself (e.g., a test designed to stress the traffic capacity of DU 412) may use a traffic simulator that is in communication with RU 414 or directly with DU 412 rather than actual UE.

As illustrated, when RU 414 is used, RU 414 is on-site at the testing location. Depending on the embodiment, DU 412 may or may not also be on-site. In system 400, DU 412 is hosted using general-purpose computing resources with the functions of DU 412 being realized through special-purpose software and/or firmware. RU 414 can communicate with DU 412 via router 413, which also may be used by DU 412 to communicate with cellular network 120.

In order to isolate environment 410 from the production aspects of cellular network 120, a defined slice may be used that restricts all traffic involving UE 416, RU 414, router 413, and/or DU 412 to a particular test slice. Only a defined amount of resources of cellular network 120 may be allocated to the defined test slice. In some embodiments, such as in the illustrated embodiment of system 400, some cellular network components, such as CU 411, can be shared between the one or more production slices of the cellular network and the test slice. Therefore, while DU 412 and RU 414 may be wholly dedicated to isolated test environment 410, CU 411 may be a shared resource between the production and test environments. The parameters of the test slice and the production slices can define how the resources of CU 411 are allocated.

Figure 5:
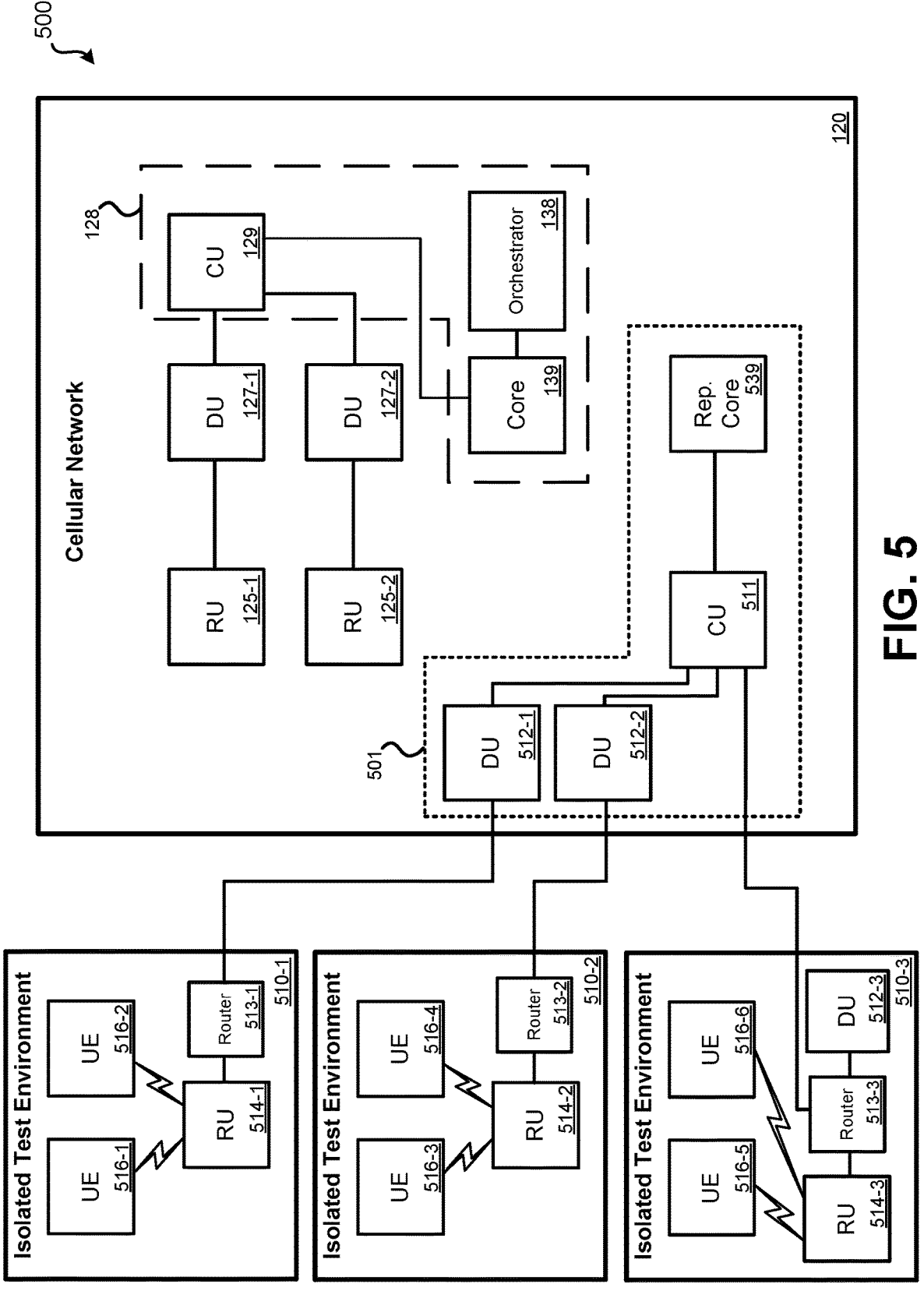
FIG. 5 illustrates an embodiment of a system in which multiple distinct isolated test environments are integrated with a cellular network.

FIG. 5 illustrates an embodiment of a cellular network system ("system 500") in which multiple isolated test environments are integrated with a cellular network. System 500 includes several variations which can be individually implemented or implemented in combination with each other. Specifically, system 500 includes: 1) the use of multiple isolated test environments; 2) the use of a DU remote from its isolated test environment; 3) the use of a dedicated test CU; and 4) the use of replicated cellular network components. These features can be used in combination, as a subset, or separately in different embodiments. Each feature is detailed below respectively.

Multiple isolated test environments 510 can exist simultaneously, each with their own UEs 516, routers 513, RUs 514, and, possibly, on-site DU (e.g., DU 512-3). Practically, many vendors or other forms of outside entities may need to be simultaneously testing either their UE or some other network component (e.g., an updated pod of an NF). Therefore, each isolated test environment 510 may be isolated from the production environment of the cellular network and from each other. Accordingly, testing within isolated test environment 510-1 has no effect on testing within isolated test environment 510-2 or isolated test environment 510-3.

While isolated test environment 510-3 can utilize an on-site DU (DU 512-3) as detailed in relation to system 400, isolated test environment 510-1 and isolated test environment 510-2 utilize remote DUs. Rather than the DUs being collocated with RUs 514, DUs 512-1 and 512-2 are located geographically remotely from their respective isolated test environments. Further details regarding the architecture of remotely located DUs is detailed in relation to FIG. 6. Such an arrangement may significantly reduce the amount of processing capabilities located onsite at isolated test environments 510-1 and 510-2. Rather, only one (or more) RUs and a router may be present at each location to be used as an isolated test environment. Between router 513-1 and DU 512-1 may be a dedicated high speed communication link. Similarly, a dedicated high speed communication link may be present between router 513-2 and DU 512-2.

While system 400 was focused on use of a shared CU that performed functions for both the production and test environments, CU 511 can be dedicated to only serving test slices. Each of isolated test environments 510 may a dedicated test slice. Each of these test slices may be serviced by CU 511. (While FIG. 5 is focused on the use of a replicated cellular network, as detailed below, when used with cellular network 120, a dedicated CU may also be used.) Use of a dedicated CU can involve a CU being instantiated in the cloud that is mapped to only performing functions for the test slices. Such an arrangement may be beneficial particularly when the testing involves testing CU-level functionality, such as functionality related to the SDAP layer, the PDCP layer and the RRC layer.

While system 400 involved using separate slices for production and testing, but using the same core, in some situations it may be beneficial to use an entirely separate core that is devoted exclusively to testing. Cellular network 120 may remain unchanged except for the instantiation of test components 501, which can include replicated core 539. Replicated core 539 can include some or all of the same components (and version of components) and associated resources used for core 139.

As detailed in relation to FIG. 2, core 139 can be implemented on a public cloud computing platform. Accordingly, replicating core 139 may be a relatively easy task (compared to if specialized hardware was used instead). Some or all NFs of core 139 can be replicated on the cloud computing platform and assigned either the same or some other amount of processing resources. For example, for testing purposes, only some NFs may be needed in replicated core 539. Alternatively, the entirety of core 139 can be replicated such that testing performed using replicated core 539 mirrors how core 139 would behave. In this arrangement, since CU 511 routes traffic to replicated core 539 and has no communication with core 139, a specifically defined test slice may not be needed. However, test slices may still be employed to segregate each of isolated test environments 510.

Notably, in other embodiments, rather than using replicated core 539, CU 511 can communicate with core 139. As such, core 139 can provide core services, such as those detailed in relation to FIG. 1B, to both test slices in test environments and production slices in the production environment.

In some embodiments, to simulate network traffic (e.g., thousands of UE communicating), replicated core 539 can be connected with one or more components that simulate UE traffic or simulate traffic from some higher-level component. For example, a component connected with replicated core 539 could simulate communications from multiple CUs.

Figure 6:
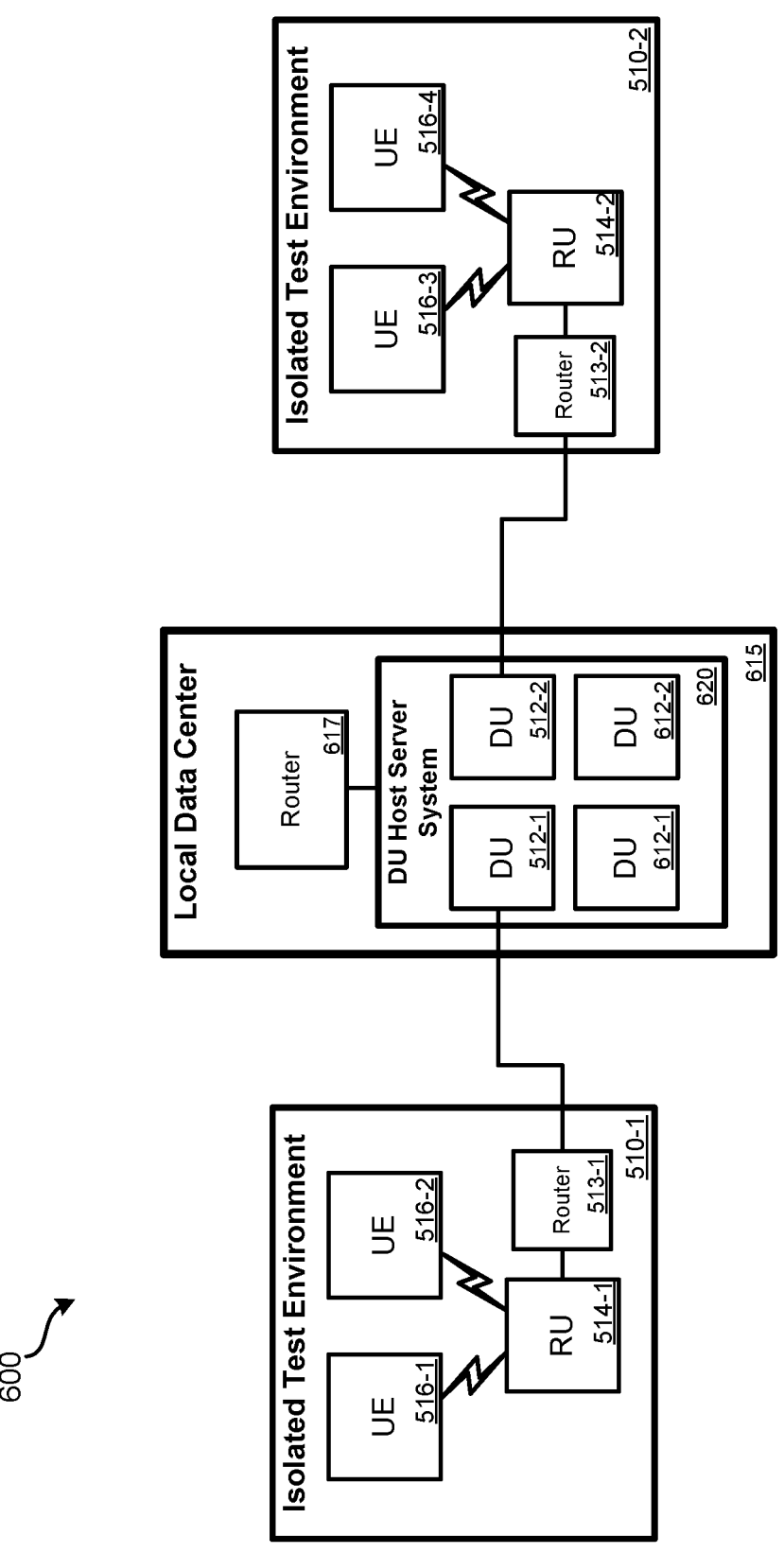
FIG. 6 illustrates an embodiment of a distributed unit being hosted remotely from an isolated test environment.

FIG. 6 illustrates an embodiment of a cellular network architecture 600 ("architecture 600") in which multiple DUs are hosted remotely from isolated test environments. Architecture 600 can be incorporated in one or more geographic locations as part of system 500 of FIG. 5. For example, architecture 600 may be particularly useful for reducing the amount of equipment needing to be on-site within the isolated test environments. Architecture 600 can include: local data center 615-1 ("LDC 615-1"); router 617; DU host server system 620; DUs 512 and DUs 612; and isolated test environments 510-1 and 510-2.

RUs 514-1 and 514-2 are essentially a radio that converts digital data from a corresponding DU to RF and RF to digital data for transmission to a corresponding DU. As such, RUs do not analyze the data included in any transmit or receive signal. When converting RF to digital data, the amount of data created is constant regardless of the number of UE and amount of data being sent by the UE to the RU. Therefore, for example, a constant bit rate signal is present from RU 514-1 to LDC 615 regardless of the number of UE communicating with RU 514-1. Based upon the data rate of this uplink signal from RU 514-1 to LDC 615, the uplink bandwidth of a connection (e.g., fiber optic connection) between isolated test environment 510-1 and LDC 615 can be reserved.

A similar arrangement is present for isolated test environment 510-2. The connections between isolated test environments 510-1 and 510-2 and LDC 615 can allow for encoded, but not necessarily encrypted, data to be transmitted between an RU and corresponding DU. Since the data remains encoded to be transmitted by or as received from an RU, the data is essentially as secure as the RF signal transmitted between the RU and the UE. Therefore, additional encryption may not be necessary. In other embodiments, an additional layer of encryption between an RU and corresponding DU over the fiber optic connection may be added for increased security. While the embodiments herein are focused on fiber optic connections, other forms of transport for high-bandwidth digital data may additionally or alternatively be used, such as a microwave communication link.

Local data center 615 may be geographically separated from isolated test environments 510-1 and 510-2. In some embodiments, LDC 615 may be co-located with one of the isolated test environments. DU host server system 620 may represent one or more computer servers, that include multiple processors and one or more non-transitory processor-readable mediums, on which special-purpose software can be executed. Each of DUs 512 and 612 can be a separate instantiation of the same special-purpose software. By sharing underlying hardware of DU host server system 620 across multiple DUs, resources, such as memory and processing resources, can be shared. Therefore, if a particular DU needs additional resources, DU host server system 620 may be able to devote idle resources (such as those not being used by another DU instance) to the instance of the DU in need of the additional resources. A minimum amount of resources may always be devoted to each DU instance. A pool of excess resources may be available for use by a DU instance in need of additional resources.

While each of DUs 512-1, 512-2, and 612 may be executed on the same underlying hardware, in some embodiments, separate hardware may be used for each of DUs 630. For example, each of DUs 512-1, 512-2, and 612 can be implemented as special-purpose hardware at LDC 615. Fiber optic connections 640 may be connected with DU host server system 620. In some embodiments, fiber optic connections 640 may be connected with router 617, which may route communications as needed to DU host server system 620 and the specific instances of DUs 630. A high bandwidth connection from LDC 615 may be connected to a CU and to the 5G core network, which can be co-located at the same facility or hosted elsewhere. In embodiments, multiple DU host server systems may be present at LDC 615 to support a greater number of light base stations.

While DUs 512-1 and 512-2 may correspond to RUs at isolated test environments, DUs 612 may be used as part of the production cellular network. Such DUs may be connected with off-site RUs as part of a gNodeB of the production cellular network. Therefore, DU host server system 620 can host both DUs that are used for off-site isolated test environments and DUs that are used as part of a production cellular network.

Figure 7:
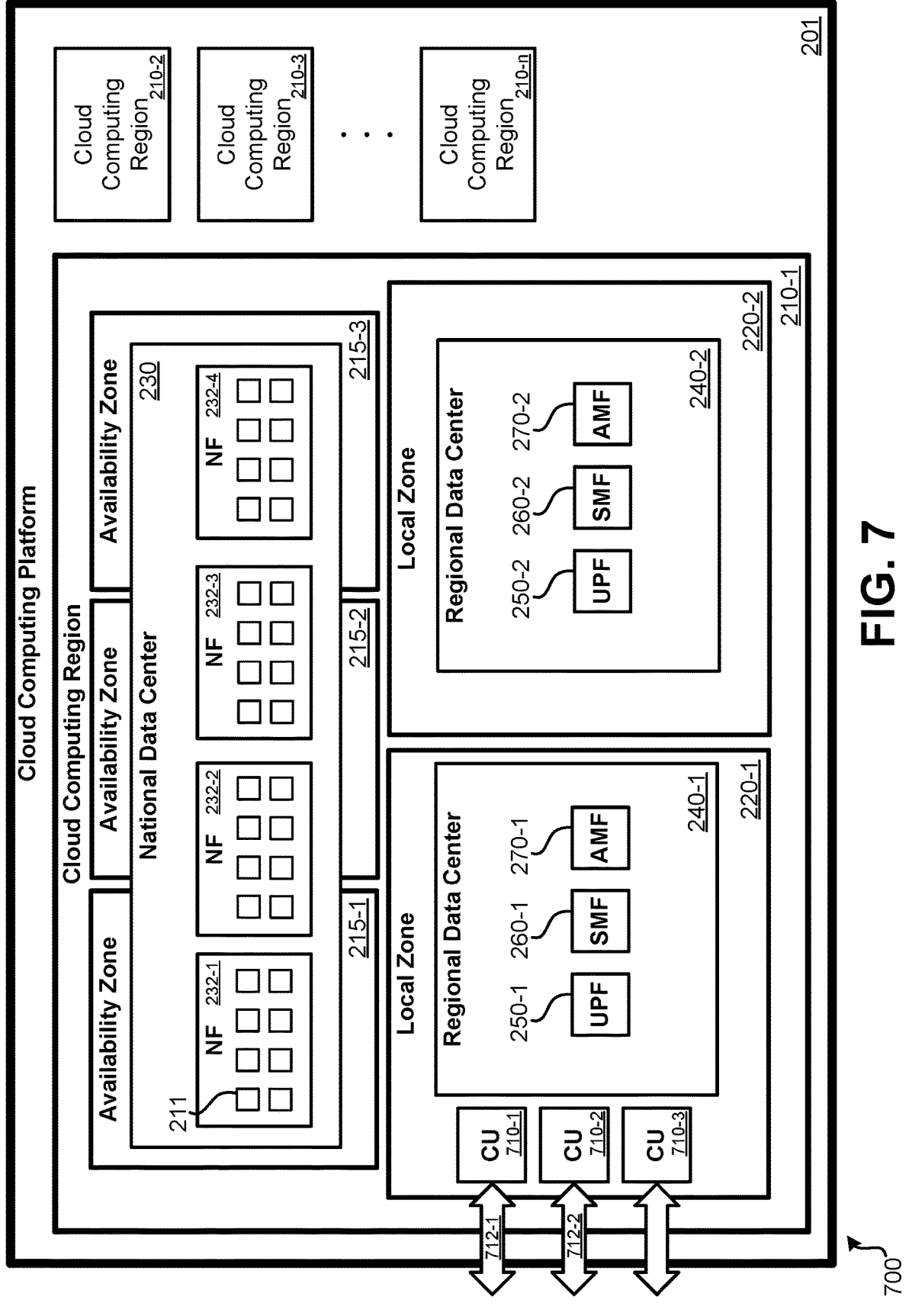
FIG. 7 illustrates an embodiment of a 5G cellular network core implemented on a cloud computing platform with testing-dedicated centralized units.

FIG. 7 illustrates an embodiment of a cellular network core 700 implemented on a cloud computing platform 201 with testing-dedicated centralized units 710. CUs 710 can be instantiated within a local zone of a cloud computing region, such as local zone 220-1 or cloud computing region 210-1. CUs may be dedicated for testing purposes and only used for one or more testing slices such as if high-level CU protocol stack layers are to be tested. CU 710-1 may communicate 712-1 with one or more DUs used for testing purposes. For example, referring to FIG. 5, CU 710-1 may be used as CU 511. CU 710-2 and CU 710-3 may be used in conjunction with other slices and other DUs that are each mapped to one or more isolated test environments. As an example, CU 710-2 may communicate 712-2 with one or more DUs hosted by DU host server system 620 at LDC 615.

LDC 615 may be a physical data center operated by the cellular network operator. LDC 615 can have a high speed communication link with the public cloud computing platform to allow the DUs hosted by DU host server system 620 to communicate with higher-level cellular network components, such as CUs 710.

Figure 8:
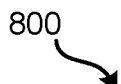
FIG. 8 illustrates an embodiment of a method for performing testing using an isolated test environment integrated with a cloud-native cellular network core.
Figure 8:
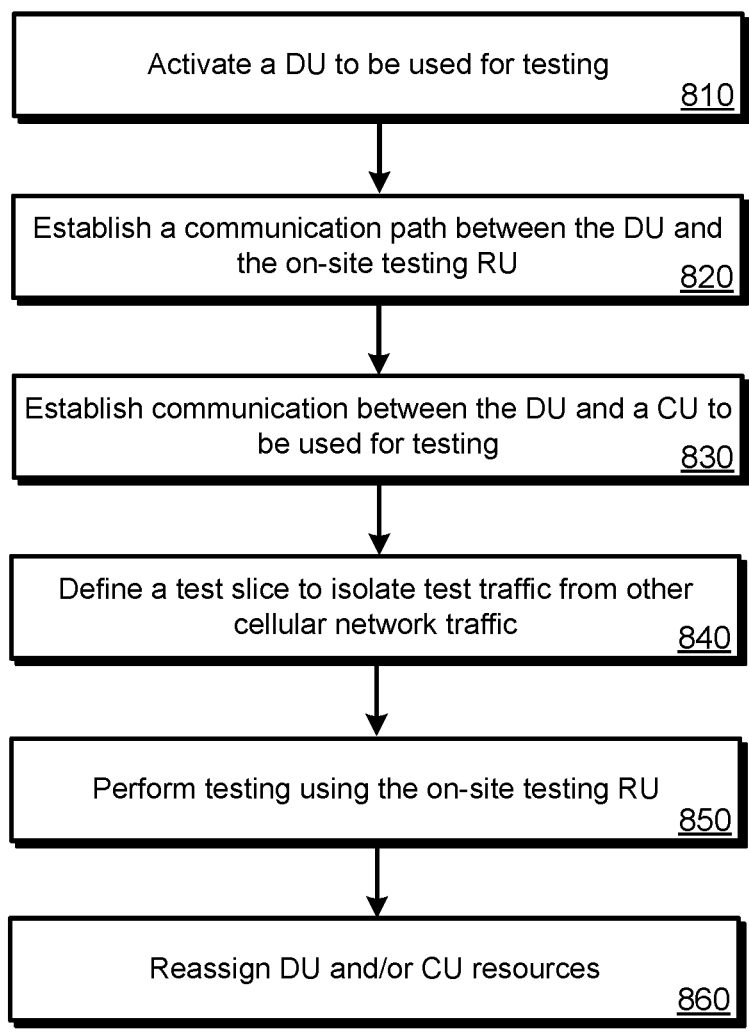

Various methods may be performed using the systems of FIGS. 1-7. FIG. 8 illustrates an embodiment of a method 800 for performing testing using an isolated test environment integrated with a cloud-native cellular network core. Method 800 can be performed using the systems of FIG. 4 or 5, possibly in conjunction with the arrangement of FIGS. 6, 7, or both.

At block 810, a DU may be activated for testing purposes. The DU of block 810 may be located on-site where an isolated test environment is to be located (as in FIG. 4) or the DU may be remotely located from the isolated test environment, such as detailed in relation to FIG. 6. At block 820, a communication path, such as via one or more routers, can be established between the onsite or offsite DU and one or more RUs located onsite where testing is to be performed. In some embodiments, no RU may be present and a test component may be used to simulate communication traffic.

At block 830, communication may be established between the DU and the CU that is to be used for testing. If a CU is to be used exclusively for testing, a CU may be instantiated in the cloud such as in a local zone of a cloud computing region, as detailed in relation to FIG. 7. Alternatively, a CU may service both one or more isolated test environments and also the production environment of the cellular network. Therefore, a preexisting CU may be used for testing.

At block 840, a test slice may be defined using the cellular network. This test slice segregates communication traffic related to testing and the isolated test environment from communication involving the production cellular network. A test slice may be defined such that all UE to be used for testing or all traffic involving the RU or DU is mapped to the test slice. Therefore, either the UE involved in the test or components of the gNodeB (e.g., RU, DU) are mapped to the test network slice. If a CU is shared between the production cellular network and the isolated test environment, a defined portion or percentage of the CU's resources may be assigned to the test slice.

In some embodiments, one or more components of the cellular network core are replicated such that an entirely separate core is used for testing, rather than the production core. If the production core is used, NFs are executed on behalf of the test slice and one or more production slices of the cellular network.

At block 850, testing is performed as needed within the isolated testing environment without the production cellular network being affected. This testing may be performed by a vendor of the cellular network within the isolated test environment at a facility of the vendor. Many isolated test environments may exist simultaneously.

At block 860, the resources devoted to the test slice, the DU, and/or the CU can be reassigned and used for other purposes once the testing is complete. For example, if the DU is implemented using a remote DU host server system, the resources previously used for the test DU may be reallocated for use as a DU as part of the production cellular network. As another example, a CU instantiated for test on the public cloud computing platform may be destroyed. A new CU may be instantiated for testing or the production cellular network when needed.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A cellular network system having an integrated isolated test environment, the cellular network system comprising:
   a cellular network, comprising a radio access network (RAN) and a cellular network core, wherein the cellular network services a production slice and the RAN comprises a centralized unit (CU) and the cellular network core of the cellular network is hosted using a public cloud computing platform;
   an isolated test environment, comprising:
      a radio unit (RU) dedicated to the isolated test environment;
      a distributed unit (DU) dedicated to the isolated test environment, wherein:
         the RU communicates with the DU;
         the DU communicates with the CU of the RAN of the cellular network that services the production slice; and
         the DU communicates with the CU using a test slice.

2. The cellular network system of claim 1, wherein the DU of the isolated test environment is co-located with the RU dedicated to the isolated test environment at a location where testing is being performed.

3. The cellular network system of claim 1, wherein the DU of the isolated test environment is hosted remotely from the RU dedicated to the isolated test environment.

4. The cellular network system of claim 1, wherein the DU of the isolated test environment is hosted at a local data center (LDC) with a plurality of DUs used on the production slice of the cellular network.

5. The cellular network system of claim 1, further comprising:
   a plurality of UE, wherein the UE are assigned to the test slice and communicate with the CU via the RU and the DU dedicated to the isolated test environment.

6. The cellular network system of claim 1, further comprising:
   a second isolated test environment, comprising:
      a second RU dedicated to the second isolated test environment; and
      a second DU dedicated to the second isolated test environment, wherein:
         the second DU communicates with a second CU of the cellular network; and
         the DU communicates with the second CU using a second test slice.

7. The cellular network system of claim 6, wherein the second CU is dedicated to servicing only the second test slice.

8. The cellular network system of claim 1, wherein the CU of the cellular network is hosted using a local zone of the public cloud computing platform.

9. The cellular network system of claim 1, wherein the cellular network is a 5G New Radio (NR) cellular network and the cellular network core is a 5G native core.

10. A method for performing testing using a cellular network, the method comprising:
   activating, on the cellular network, a distributed unit (DU) to be used exclusively for an isolated test environment, wherein a cellular network core of the cellular network is hosted using a public cloud computing platform;

establishing, on the cellular network, a communication path between the DU and a radio unit (RU) located at a location to where the isolated test environment is located;

establishing, on the cellular network, communication between the DU and a centralized unit (CU) to be used as part of the isolated test environment;

defining, on the cellular network, a test slice that isolates all traffic on the DU and RU from a production slice, wherein the CU services the test slice and the production slice; and performing testing using the RU and DU.

11. The method for performing testing using the cellular network of claim 10, wherein the DU of the isolated test environment is co-located with the RU dedicated to the isolated test environment at the location where testing is being performed.

12. The method for performing testing using the cellular network of claim 10, wherein the DU of the isolated test environment is hosted remotely from the location at which the RU dedicated to the isolated test environment is located.

13. The method for performing testing using the cellular network of claim 10, wherein the DU of the isolated test environment is hosted at a local data center (LDC) with a plurality of DUs used on the production slice of the cellular network.

14. The method for performing testing using the cellular network of claim 10, wherein performing the test using the RU and DU comprises:

performing testing using a plurality of UE, wherein the UE are assigned to the test slice and communicate with the CU via the RU and the DU dedicated to the isolated test environment.

15. The method for performing testing using the cellular network of claim 10, further comprising:

activating, on the cellular network, a second DU to be used exclusively for a second test environment;

establishing, on the cellular network, a second communication path between the second DU and a second RU located at a second location to where the second test environment is located; and establishing, on the cellular network, communication between the second DU and a second CU to be used as part of the second test environment.

16. The method for performing testing using the cellular network of claim 15, wherein the second CU is dedicated to servicing only the second test environment.

17. The method for performing testing using the cellular network of claim 10, wherein the CU of the cellular network is hosted using a local zone of the public cloud computing platform.

18. The method for performing testing using the cellular network of claim 10, wherein the cellular network is a 5G New Radio (NR) cellular network and the cellular network core is a 5G native core.

\* \* \* \* \*